Patented Apr. 25, 1933

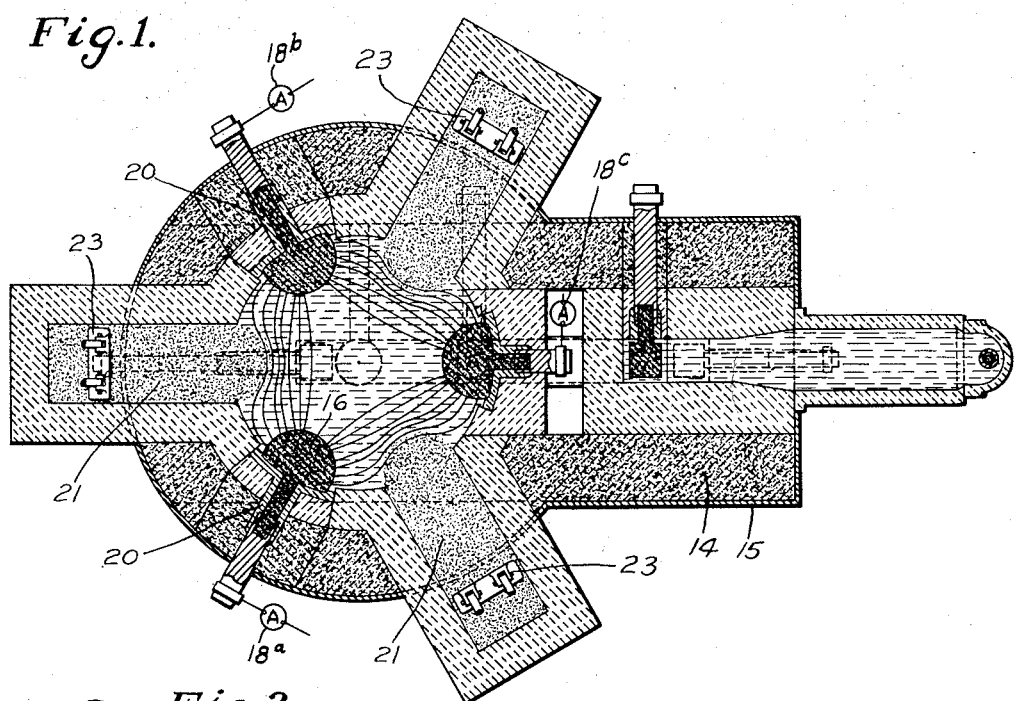
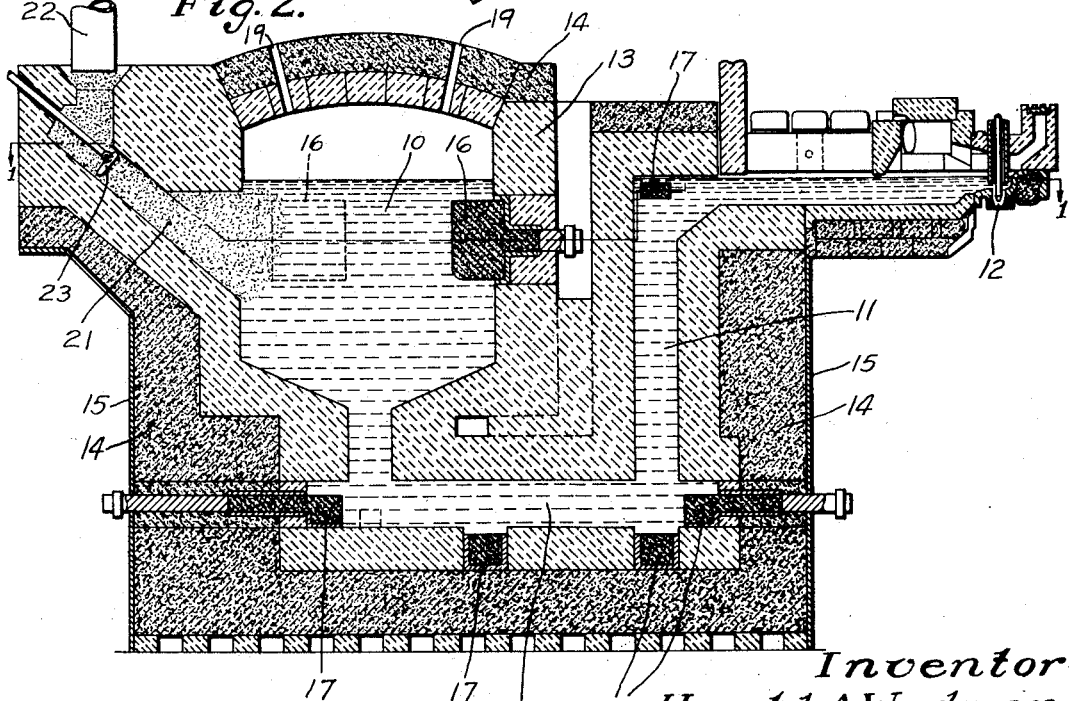

1,905,534

UNITED STATES PATENT OFFICE

HAROLD A. WADMAN, OF WEST HARTFORD, CONNECTICUT, ASSIGNOR TO HARTFORD-EMPIRE COMPANY, OF HARTFORD, CONNECTICUT, A CORPORATION OF DELAWARE

APPARATUS FOR AND METHOD OF MAKING GLASS

Application filed July 25, 1931, Serial No. 553,040. Renewed September 9, 1932.

This invention relates to apparatus for and methods of making glass by electricity in which the molten glass acts as the resistance, and more particularly relates to the correlationship of the feeding of batch with reference to the paths of electric current.

A primary object of this invention is to provide an apparatus whereby glass-forming materials may be melted into glass, electrically, more rapidly and with less heat loss than has heretofore been possible.

My invention greatly reduces the refractory wall surface in contact with the glass bath by feeding batch in a manner such that the bath is substantially enclosed in side walls of batch, which cause a concentration of current away from the refractories. Thus the invention utilizes heat which normally is wasted by conduction through and radiation from the walls of the furnace, lengthens the life of the portions of the refractories most subject to wear by cooling them with incoming batch, and provides a method of progressively heating the batch so that chemical combination of various elements thereof may occur before the batch is brought into contact with the molten glass and melted.

I provide a glass-making furnace in which the main supply of batch melting electric current is introduced into a relatively small portion of the bath of glass, in which portion of the bath the greatest heating effect of the current is produced. In order not only to save unnecessary wear on the refractories in this portion of the furnace, but to most fully utilize the heating effect of the current in the best manner and to assure against overheating of the electrode, I feed the glass-making material into the furnace through the side walls thereof below the glass level and on both sides of each electrode, so that the current is concentrated away from the refractories of the furnace side walls and along the edges of the comparatively cool and non-conductive incoming batch. Thus, as far as is practically possible, the side walls of the basin containing the melting glass are composed of batch which is constantly melted down into glass and constantly renewed. Also the batch is thus efficiently preheated, and substantially all of the heat developed by the current is efficiently applied to the melting of batch and glass and a minimum thereof is lost through the refractories. Moreover, much of the heat which would otherwise pass through the refractories to the outer air is in the furnace of my invention conducted through the refractories to the batch as it passes through the wall, and serves to preheat this batch which is moving toward the glass bath.

In the preferred embodiment of my invention illustrated in the drawing, Figure 1 is a horizontal section taken on the line 1—1 of Fig. 2 of a glass-making furnace employing a three-phase circuit; and Fig. 2 is a vertical section of that furnace taken substantially through a median line thereof.

Referring particularly to Fig. 2, the furnace embodying my invention is constructed so as to form a container 10 for a relatively deep bath of glass, from which the molten glass is withdrawn through the bottom thereof, passing through channels 11 to an outlet 12, in this case indicated as a forehearth for a plunger feeder. Obviously other means may be utilized for using the glass, such as a sheet glass withdrawing apparatus, or the tank may be used for melting substances other than glass but having similar properties, such as soluble silicates of soda, lime-aluminum silicates, and enamels.

The furnace structure proper is composed of tank blocks 13 insulated by a layer of insulating material 14 such as kieselguhr, which may be held in place by a metallic casing 15. Openings 19 in the crown are provided for the escape of gases.

The main or melting current is introduced by three electrodes 16 designed for connection to a source of three-phase electric current. Means, preferably ammeters 18a, 18b, and 18c, are provided for measuring the current flow through the line leading to each of the three electrodes. Supplemental electrodes 17 are arranged for connection primarily to a single phase system and preferably are arranged so that the current can be caused to pass between any two or any pairs of electrodes, the supplemental electrodes being for the purpose of applying heat to the furnace when the glass is first introduced in order to bring it up to an operating temperature, or in case the glass should happen to run too cold, to heat it in preferred portions of the tank to bring it up to a working temperature.

The electrodes preferably are of graphite and are spaced from the refractory walls of the furnace by a layer of glass as at 20. If desired, the electrode leads may be cooled by known means.

In this embodiment of my invention, the melting end of the furnace is preferably of circular form and the electrodes 16 are spaced equidistantly about the circumference thereof. Equidistant between each of the electrodes is a batch feeding passage 21 arranged to open into the melting end of the tank below the surface of the glass and connecting at the outer, and preferably at the upper, edge of the tank with a batch feeding supply means as at 22. A batch pusher bar 23 may be provided and may be actuated by any preferred means, either manually or mechanically, to intermittently or continually push the batch through the passage 21 into the glass.

In making glass in a three-phase furnace it is desirable that the three phases of the main melting current be balanced. It will be obvious that if batch is fed to the furnace in unequal amounts through the three openings, or for some reason is reduced more rapidly in one portion of the furnace than in another, the phase relationship will become unbalanced. Any unbalancing of the phase relationship which does occur may be promptly noted from a reading of the ammeters and the condition corrected by a change in the amount of batch fed through particular openings. For example, assuming that ammeter 18a (Fig. 1) records a greater current flow than either ammeters 18b or 18c, it indicates that less current is passing between lines containing ammeters 18b and 18c than is passing between either of these two lines and the line containing ammeter 18a.

A necessary corollary is that there is less heat being generated in the glass between the electrodes connected to lines having ammeters 18b and 18c than between those electrodes and that connected to line 18a. Consequently, less batch is melted between the first two electrodes than is melted between either of them and the third electrode. Such a condition becomes progressively worse since the increasing amounts of unmelted batch increase the resistance in that part of the furnace.

In correcting this unbalanced condition it is desirable, in order to maintain constant the capacity of the tank, that any decrease in the amount of batch fed through one opening to decrease the resistance of the bath of glass lying between the electrodes on both sides of the opening be compensated for by a corresponding increase in the amount of batch fed through the other two openings. This may be accomplished by a manual control of the batch feeding means, or may be mechanically or electrically accomplished by any preferred means suitable for the purpose. For instance, in a mechanical control the speed of motors actuating batch feeders could be governed by the resistance of the lines leading to each of the electrodes.

In a homogeneous medium the electric current passing between the electrodes would ordinarily be concentrated, or would tend to concentrate, in a path composed of straight lines connecting the electrode faces and the density of the current would decrease as the distance from this path increased.

It will be obvious from a consideration of Fig. 1 that in a structure such as described the path of greatest current density would ordinarily lie closely adjacent to the walls of the tank intermediate the electrodes. If in such a furnace batch were fed in the ordinary manner onto the surface of the glass either at a point along the edge of the tank, as taught by United States Patent No. 1,610,377, granted December 14, 1926, to Harry F. Hitner, or on the middle, as is taught by United States Patent No. 1,820,248, granted August 25, 1931, to J. K. B. Raeder in connection with a vertical melting tank, there would be a large heat loss through the walls of the tank between the electrodes due to the conduction of the refractories and the radiation therefrom.

The present invention contemplates the recovery of a large percentage of the heat heretofore lost through the refractories by the positioning of the batch feeding mechanisms, as shown, at the point where the greatest amount of heat is generated in the glass and at the point where the refractories otherwise would be most highly heated and most subject to wear from such highly heated glass.

In such a method of feeding as has been heretofore commonly practiced, the batch is preheated only by the heat arising from the upper surface of the bath of glass and perhaps by the gases escaping through the batch feeding opening.

In the practice of the present invention, the batch is preheated to such an extent that the chemical combination of various elements therein occurs before the batch is actually brought into the bath of glass and subjected to the main melting heat. For this reason, the batch feeding passages are designed so as to be of relatively large capacity as compared to those of prior tanks of similar melting capacity, which permits the slow feed of batch through these passages. Thus the batch may attain the greatest amount of heat before being introduced into the glass in the tank.

The batch, even when heated, being of less electrical conductivity than the molten glass as it is introduced into the tank, forces the main path of the electric current away from the walls, as indicated in Fig. 1, and causes a concentration thereof in the molten glass at the edge of the batch, thus most highly heating the glass with which the batch is in contact, and consequently facilitates the rapid reduction of the batch to glass. Thus I provide by means of the batch a concentration of current at the point where it is most needed to reduce the batch, and at the same time do this away from the refractory walls which would be most subject to wear from the highly heated glass.

Where, in the specification and in the claims, I refer to glass, it is to be understood that such term is to be construed as including not only what is technically known as glass, but other similar substances such as soluble silicates of soda, lime-aluminum silicates, and enamels.

While certain features of the present invention are more or less specifically described as relating to a three-phase system, it is apparent that many features are applicable to a single phase system, and I wish it to be understood that various changes may be resorted to within the scope of the appended claims.

I claim as my invention:

1. In a furnace for making glass and similar substances in which the glass acts as a resistance to a current of electricity, a plurality of electrodes submerged in the glass and located so that the major portion of a current of electricity passing therebetween tends to flow through the glass adjacent the side walls of the tank, and means for passing batch through said side walls between the electrodes and into the major portion of the current passing therebetween, whereby the zone of greatest current density and of greatest heat is removed from said side walls by the relatively non-conductive batch.

2. In a furnace for making glass and similar substances in which the glass acts as the resistance to a current of electricity, electrodes located to introduce a three-phase current of electricity to the glass, and means comprising the material to be melted for bending the normal lines of flow of each phase toward a common point, said point being remote from the walls of the tank.

3. The method of making glass which comprises passing a multi-phase current of electricity between electrodes in contact with a bath of molten glass, feeding glass-forming materials into the path of the current passing between each pair of electrodes, and varying the rate at which such materials are fed in accordance with the resistance of each of said paths to obtain a predetermined desired relationship between the resistances of the several paths.

4. The method of making glass which comprises passing a multi-phase current of electricity between electrodes in contact with a bath of molten glass, feeding glass-forming materials into the path of the current passing between each pair of electrodes, decreasing the resistance of any path which is of higher resistance than any other path and increasing the resistance of other paths in an amount the sum of which is equal to the decrease in the first-mentioned path by varying the rate of feed of the glass-forming materials.

5. The method of making glass which comprises passing a multi-phase current of electricity between electrodes in contact with a bath of molten glass, feeding glass-forming materials into the path of the current passing between each pair of electrodes, decreasing the resistance of any path which is of higher resistance than any other path, and increasing the resistance of paths having a lesser resistance than said first-named path by varying the rate of feed of glass-forming materials into said paths while maintaining constant the total amount of batch-forming materials fed to the furnace.

6. Apparatus for making glass, comprising a container for a bath of molten glass having lateral glass confining walls a portion of which is composed of the glass making materials to be melted and converted into glass, means for supplying heat to the glass of said bath, means for supplying glass making materials to the wall portion of the same from outside said container, and means for forcing the glass making materials of the glass confining wall portion inwardly of said container to compensate for the melting off of such materials from the innermost part of said wall portion by contact with the molten glass of said bath.

7. Apparatus for making glass, comprising a container adapted to hold a bath of molten glass the surface of which is at a predetermined normal level therein, a passage formed in a lateral wall of said container and extending from a point above said level at the outside to a point of communication with the inside of said container beneath said predetermined level, means for supplying heat to the glass of said bath, means for supplying glass making materials to the outer end of said passage, and means for forcing the glass making materials through said passage into said bath and adapted to move the materials into the bath at a rate substantially the same as the rate of melting off of the materials by contact with the molten glass of said bath, whereby the line or zone in contact between the molten glass of said bath and the dry glass making materials may be maintained substantially constant, and whereby should the means which force the glass making materials into the bath through said passage be out of operation for a material length of time, the glass making materials in the passage could be all converted into molten glass without danger of the molten glass flowing out through said passage due to the passage terminating above the normal level of said bath at its outer end.

8. The method of making glass, which comprises establishing a bath of molten glass partly confined by walls of the glass making materials to be melted and converted into glass and replenishing the glass making materials of said walls as the inner portions thereof are reduced to fluid glass by introducing laterally of said bath and below the normal level of the surface thereof additional glass making materials.

Signed at Hartford, Connecticut, this 21st day of July, 1931.

HAROLD A. WADMAN.